United States Patent
Woerlee et al.

(10) Patent No.: US 7,480,225 B2
(45) Date of Patent: Jan. 20, 2009

(54) METHOD FOR RECORDING INFORMATION ON A MULTI LAYER RECORD CARRIER, AND RECORD CARRIER FOR USE BY SUCH METHOD

(75) Inventors: Pierre Hermanus Woerlee, Eindhoven (NL); Hubert Cecile Francois Martens, Eindhoven (NL); Wilhelmus Robert Koppers, Eindhoven (NL); Robert Alberta Arnoldus Ponsen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 295 days.

(21) Appl. No.: 10/568,474

(22) PCT Filed: Aug. 20, 2004

(86) PCT No.: PCT/IB2004/051518
§ 371 (c)(1),
(2), (4) Date: Feb. 15, 2006

(87) PCT Pub. No.: WO2005/020232

PCT Pub. Date: Mar. 3, 2005

(65) Prior Publication Data

US 2006/0227694 A1 Oct. 12, 2006

(30) Foreign Application Priority Data

Aug. 21, 2003 (EP) ............................... 03103210
Aug. 22, 2003 (EP) ............................... 03103217

(51) Int. Cl.
*G11B 7/00* (2006.01)
(52) U.S. Cl. ..................................... 369/94; 369/275.3
(58) Field of Classification Search .............. 369/275.3, 369/94, 59.25
See application file for complete search history.

(56) References Cited

U.S. PATENT DOCUMENTS 5,729,525 A * 3/1998 Ishida et al. .............. 369/275.3

* cited by examiner

*Primary Examiner*—Nabil Z Hindi
(74) *Attorney, Agent, or Firm*—Michael E. Belk

(57) ABSTRACT

This invention relates to a method for recording information on a multi layer record carrier. The information is recorded on the record carrier according to special filling patterns, such that the record carrier is compatible with the DVD-ROM standard while the time required for closing a session and/or finalizing the disc is reduced. The information is substantially evenly distributed over the layers in blocks of a predefined amount of storage space. The size of these blocks may be flexible and set by the method or read from the record carrier.

10 Claims, 5 Drawing Sheets

METHOD FOR RECORDING INFORMATION ON A MULTI LAYER RECORD CARRIER, AND RECORD CARRIER FOR USE BY SUCH METHOD

The invention relates to a method of recording information on a multi layer record carrier. The invention relates especially to a method of recording information on a dual layer recordable DVD disc, such that this disc can be played in any DVD-ROM player. The invention further relates to a record carrier for sue by the method according to the invention, said record carrier comprising at least two information layers for storing the information.

After recording information on a recordable DVD record carrier special actions need to be taken to make the record carrier compatible with existing playback devices. When a recordable DVD record carrier has to be made DVD-ROM compliant, such that the recordable DVD record carrier can be played back in any DVD-ROM player, any unwritten areas need to be filled with dummy data according to the DVD-ROM specification. This because most DVD players cannot cope with a record carrier on which the information layer opposite to the information layer holding information has no information written on it.

Figure 1A:
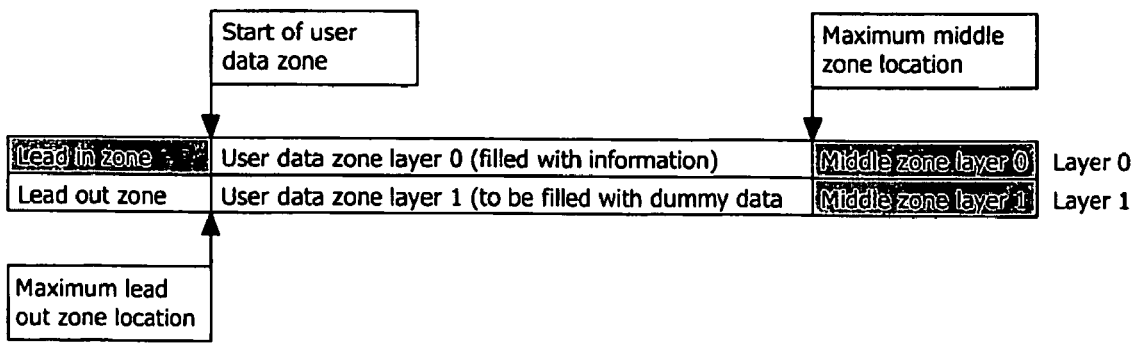
FIG. 1A shows an example of a worst-case situation for writing dummy data for a simple write scheme where a complete data zone in a layer is filled with dummy data.
Figure 1B:
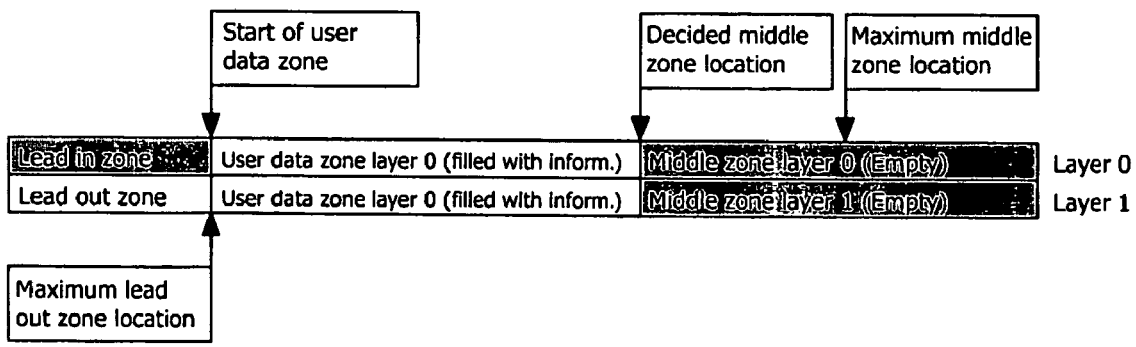
FIG. 1B shows an example of the invention where user data is alternately written to different layers.
Figure 2:
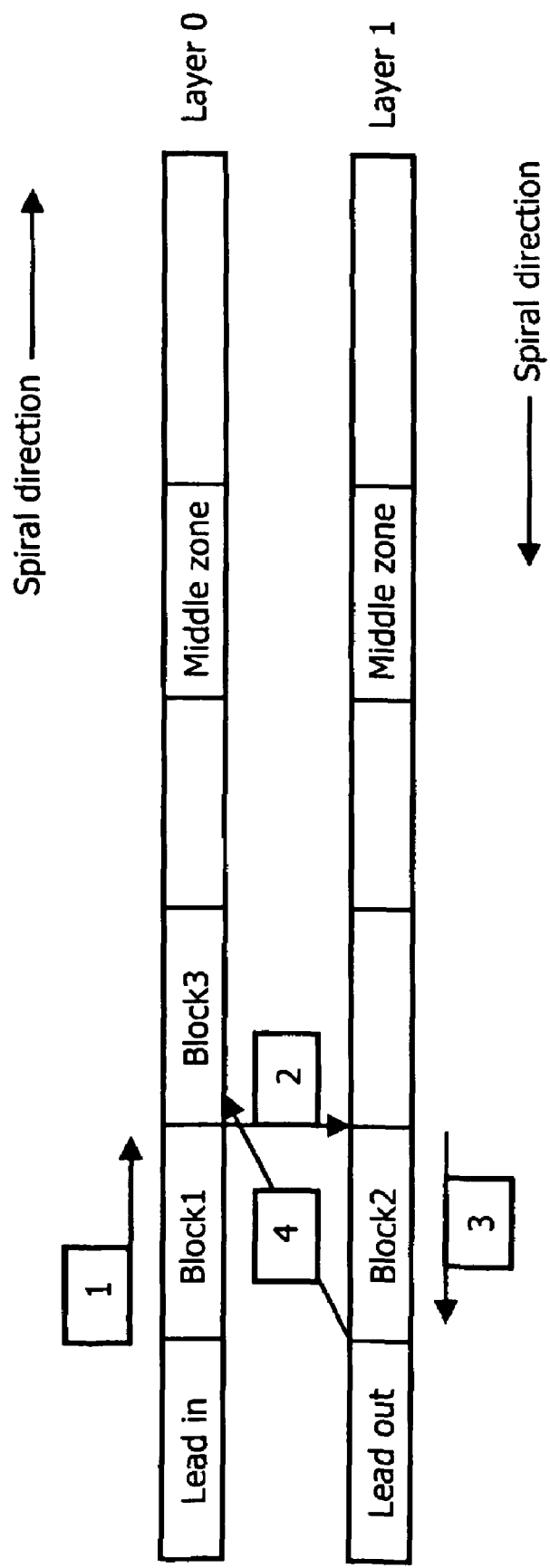
Figure 3A:
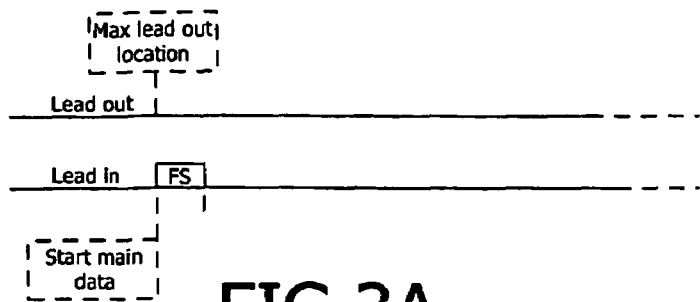
Figure 3B:
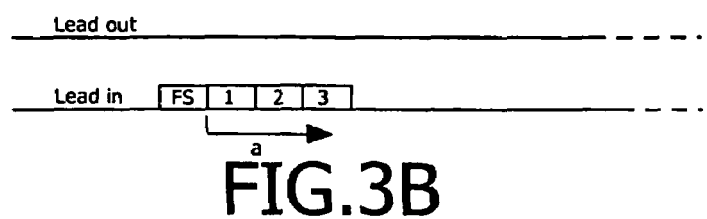
Figure 3C:
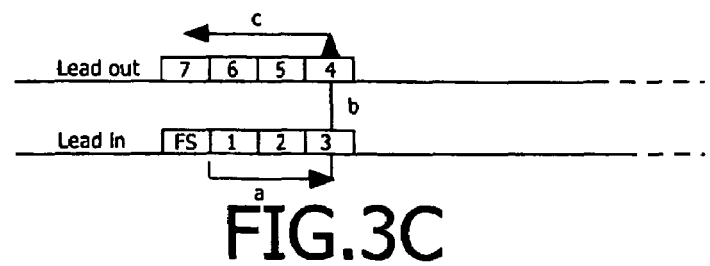
Figure 3D:
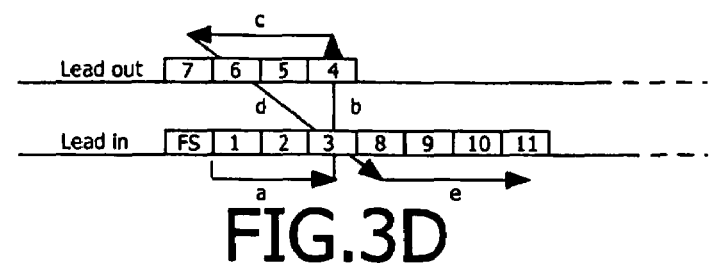
Figure 3E:
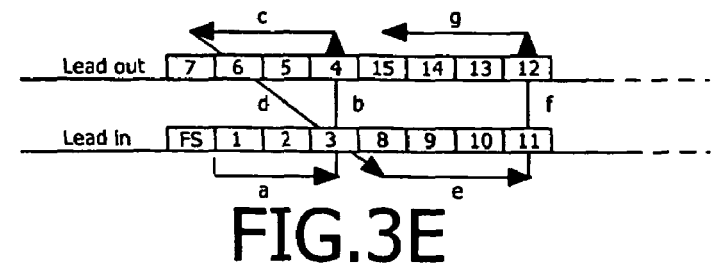
Figure 3F:
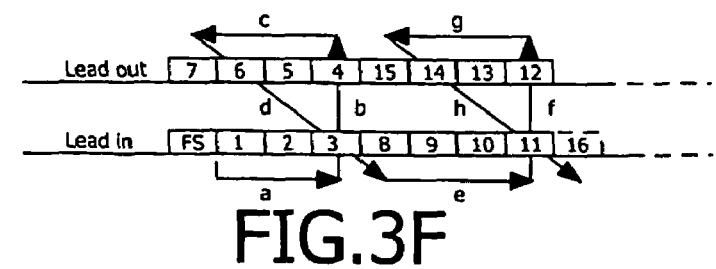

FIG. 2 schematically depicts paths, write sequences, and layer jumps of a writs operation of the method of figure 1B.

FIG. 3A-3F illustrates the steps of a first embodiment of the method of the invention for writing user data to the two layers of the disk.

Figure 4:
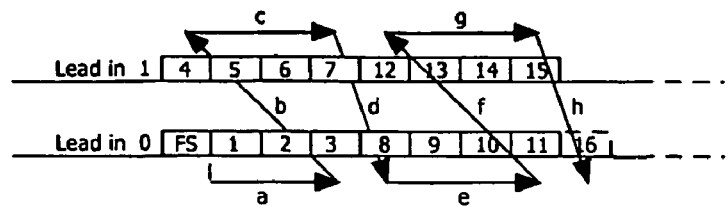

FIG. 4 illustrates the steps of a second embodiment of the method of the invention for writing user data to the two layers of the disk.

Figure 5A:
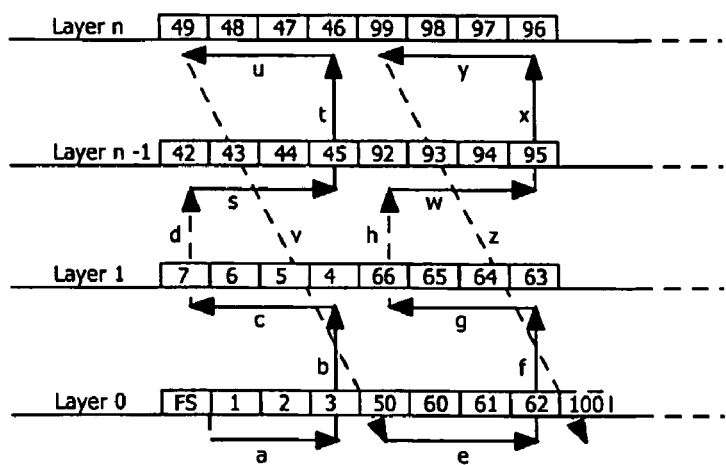
Figure 5B:
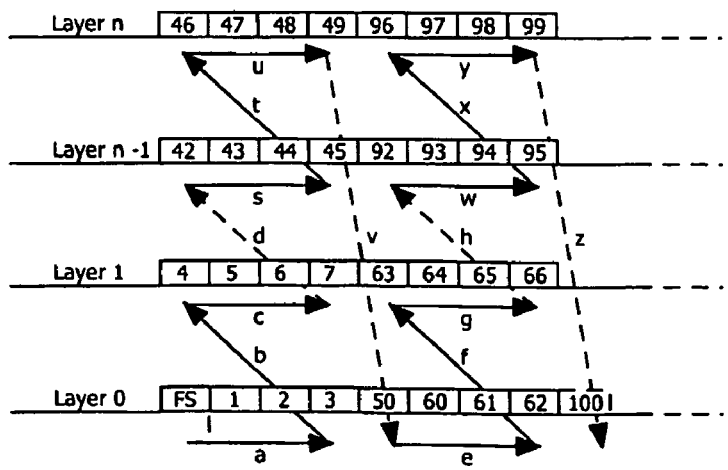

FIG. 5A-5B illustrates the steps of additional embodiments for the method of the invention for writing user data to n layers of the disk.

Figure 6:
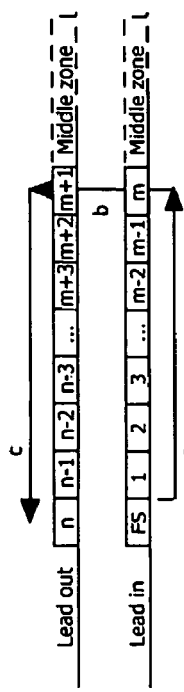

FIG. 6 is a table comparing the best-case and worst-case for writing dummy data using the simple write scheme of FIG. 1A and the write scheme of the invention.

This needs to be done when closing a session and/or finalizing a disc.

The total available size for storing data on a dual layer OTP-type (Opposite Track Path) DVD record carrier (recordable, rewritable, as well as read-only discs) is dependent on the location of the middle zone. When the amount of information to be written is known on forehand, the location of the middle zone can be decided prior to writing. However, when information of a previously unknown size has to be written on a dual layer recordable DVD record carrier, the location of the middle zone should preferably be placed at the maximum allowed position, which results in a maximum storage space. A downside of placing the middle zone at the maximum allowed position is the amount of time the filling with dummy data may take.

FIG. 1A shows an example of a worst-case situation where a complete data zone in a layer (Layer 1) has to be filled with dummy data When the complete available data zone space on a first layer, such as Layer 0 in FIG. 1A, is written with information, the complete available data zone on a second layer, such as Layer 1 in FIG. 1A, needs to be filled with dummy data in order to make the recordable disc DVD-ROM compliant. This will take a substantial amount of time.

It is an object of the present invention to provide a method of arranging the information on a dual layer record carrier such that the amount of time required for making the record carrier compatible with existing playback devices, especially with DVD-ROM players, will be reduced to a minimum. This without prior knowledge of the amount of information that should be stored.

This object is achieved by providing a method in which a specific filling pattern is used during the recordings for physically distributing the information to be recorded over the information layers of the multi layer record carrier. By using this specific filling pattern the amount of time required to close/finalize the session or disc is significantly reduced.

In the method according to the invention recording is switched from a first information layer of the disc to a second information layer of the disc each time a predefined amount of storage space is filled. This is schematically depicted in FIG. 2, where paths 1 and 3 indicate write sequences, and paths 2 and 4 indicate layer jumps. A dual layer disc, as is shown in FIGS. 1A, 1B and 2, comprises two information layers, generally referred to as the Layer 0 (L0) and Layer 1 (L1) layer. The L0 layer is the information layer located closest to the side of a disc where a radiation beam, such as a laser beam, used for reading and/or recording the information enters the disc. The drive initially writes a predefined amount of information (block 1) to layer L0 and then switches to layer L1 to write the next predefined amount of information (block 2). Next, the drive jump back to layer L0 to record a subsequent predefined amount of information (block 3) behind the previously recorded block 1.

Data to be recorded on a record carrier normally consists of several files. The logical location of each of these files is stored in file system tables. Since, for example, a DVD record carrier acts like a random access memory, the location of the files stored on the record carrier is not dependent on the order of these files in the file system. By balancing the amount of information to be written over all layers using the special filling pattern according to the invention, each of the layers will be filled at approximately the same rate.

In an embodiment of the method according to the invention the predefined amount of information (that is, the block size) is not a fixed amount, but it is an amount that is variably set by the method itself. In a preferred embodiment of the method according to the invention, a value specifying this predefined amount of information (that is, the block size) is read from the record carrier itself.

The size of the predefined amount of information influences the time required for closing a session and/or finalizing a disc. The smaller the size of the storage space for holding the predefined amount of information, the faster the closing of a session and/or the finalizing of a disc will be. This because the amount of dummy data that needs to be recorded upon closing and/or finalizing is reduced. However, such a small size of the storage space will increase the amount of layer jumps, which could negatively affect the recording performance. Moreover, because of the small block sizes, the number of track jumps dumps from one block of information to another block of information) when reading the record carrier will increase. Therefore, the optimum size of the storage space for holding the predefined amount of information is dependent on the type of use of the record carrier (such as, for example, recording of a continuous video stream or recording of data files).

According to the above-described embodiments of the invention, the size of the predefined amount of information (that is, the block size) is flexibly set depending on the type of use of the record carrier. The method may set the size automatically depending on the amount of data to be stored, on the way the data to be stored is supplied to the method (streaming or as fragmented blocks), or on the application. Alternatively, a user sets the size of the predefined amount of information manually.

Moreover, this size of the predefined amount of information needs not be fixed during the entire use of the record carrier, but according to an embodiment may be changed between recording sessions. For example, a first recording session may be recorded with a first size of the predefined amount of information, while a subsequent second recording session may be recorded with a second size of the predefined amount of information, the second size being different from the first size. In this way, a single record carrier may support different types of uses.

According to a preferred embodiment, the method reads information regarding the size of the predefined amount of information from the record carrier itself. This information may be stored on the record carrier as a parameter in an area on the record carrier comprising parameters indicative of the recording process. When the type of use of the record carrier is fixed and/or a preferred size of the predefined amount of information is known beforehand, this information may be prerecorded on the record carrier. Alternatively, the information regarding the size of the predefined amount of information may be recorded on the record carrier by the method itself. For example, the last selected size of the predefined amount of information is stored on the record carrier for re-use in a subsequent recording session.

Embodiments of the invention will now be explained in more detail with reference to the accompanying drawings.

The DVD-ROM format specification describes that an area identified as middle zone does not necessary have to be filled with data. When the middle zone is located at a position prior to its maximum position, less space has to be filled with dummy data, as is shown in FIG. 1B. When the amount of information to be written is known on forehand, the location of the middle zone can be decided prior to writing. However, when this is not the case, the special filling pattern according to this invention can be used to achieve an optimal balance between available user space and required closure time.

An embodiment of the method according to the invention is now described with reference to FIG. 3 in which the various record carrier states are shown during the various steps of the method, and in which the special filling pattern is represented by a sequence of paths:

Step One Starting from an Empty Dual Layer Record Carrier (FIG. 3a):
During recording the record carrier is treated as an open session, so a file system (FS) will not be written until the session is closed;
The middle zone location is placed imaginary at the maximum location, thus providing the maximum amount of storage space.

Step Two (FIG. 3B):
The files (1, 2 and 3) are written on the record carrier. These files are written sequentially (path a). It is noted that although the files in FIG. 3 have identical sizes, the actually written files may vary in size.

Step Three (FIG. 3C):
When a predefined amount of storage space is filled, writing of subsequent files will stop on Layer 0 and will continue on Layer 1 (path b). It is noted that this storage space for holding the predefined amount of information is the maximum amount of space (i.e., a worst-case situation) that should be padded (that is, written with dummy data) when closing a session and/or finalizing a disc. For a recordable DVD disc where a single layer may hold up to 4.7 Gbyte of data, the size of storage space for holding the predefined amount of information should preferably be in the range of 1% (approximately 50 Mbyte) to 10% (approximately 500 Mbyte). The size of the pre-defined recording area should at least be significantly less than the total amount of storage space available on a single layer.
The next files (4, 5, 6 and 7 are written sequentially (path c) on Layer 1;
Since the dual layer record carrier in this example is of an OTP (Opposite track Path) type, the direction of writing on Layer 0 (path a) is reverse to the direction of writing on Layer 1 (path c).

Step Four (FIG. 3D):
When the storage space for holding the predefined amount of information on Layer 1 is filled, or the next file to be written (8) does not fit in the remaining space, writing continues on Layer 0 again (path d);
The next files (8, 9, 10 and 11) are written sequentially on Layer 0 (path e) until a predefined location is reached.

Step Five (FIG. 3E):
The writing process will continue on Layer 1 again (path f);
The next files (12, 13, 14 and 15) are sequentially located on Layer 1 (path g). Step six (FIG. 3F):
When the current writing operation is finished, future files to be recorded (16) can be located at the next available user space (path h).

In an embodiment of the method according to the invention an alternative special filling pattern is used for recording information on a record carrier using a Parallel Track Path (PTP) addressing mode. In such a record carrier using a PTP addressing mode each layer has the addresses ranging from the inner diameter of the disc to the outer diameter. Both layers have their own lead-in and lead-out areas. There is no middle zone present like in OPT type record carriers. The steps of this embodiment are now described with reference to FIG. 4:
Reserving the file system space (FS) when the writing starts;
Writing the information on Layer 0 until a predefined position is reached (that is, until the storage space for holding the predefined amount of information is filled). The files (1, 2 and 3) are written sequentially (path a);
After a first layer jump (path b) writing the next files (4, 5, 6 and 7) on Layer 1 (path c);
When a predefined position on Layer 1 is reached, writing continues again at Layer 0 (path e) after a second layer jump (path d).

The method according to the invention is not only suitable for use with dual layer record carriers, but also for use with multi layer record carriers comprising more than two information layers. Such multi layer record carriers may use any of the OTP and PTP addressing modes. The special filling patterns for use with such multi layer discs correspond to the ones described above for dual layer discs. FIG. 5 depicts embodiments of the method according to the invention for use with multi layer record carriers consisting of 'n' layers, with either the OTP (FIG. 5A) or the PTP (FIG. 5B) addressing mode.

For a multi layer OTP type record carrier (FIG. 5A) it is assumed that the address ranges for each layer is opposite in direction with respect to the previous layer. Now, filling takes place from the lowest layer (Layer 0) up until the last layer (Layer n). Subsequent blocks (that is, storage spaces for holding the predefined amount of information) are recorded on the layers as depicted in FIG. 5A according to the following special filling pattern (that is, sequence of paths):

a→b→c→d→s→t→u→v→e→f→g→h→w→x→y→z.

Each time the topmost layer (Layer n) is reached, the next block of information will be written on the lowest layer (Layer 0) after a jump (path v, respectively, path z).

For a multi layer PTP type record carrier (FIG. 5B) it is assumed that the address ranges for each layer is in the same direction as the previous layer. Again, filling takes place from the lowest layer (Layer 0) up until the last layer (Layer n) in a saw-pattern like shape. Now the subsequent blocks (that is, storage spaces for holding the predefined amount of information) are recorded on the layers by a special filling pattern as depicted in FIG. 5B:

a→b→c→d→s→t→u→v→e→f→g→h→w→x→y→z.

Again, when the topmost layer (Layer n) is reached, the next file will be written on the lowest layer (Layer 0) after the jump (path v, respectively, path z).

By applying the special filling patterns according to the invention it is possible to exploit the maximum available user space on a record carrier to the fullest, while minimizing the amount of time required to close/finalize the disc or session. When, for example, a recordable DVD disc is written using the filling patterns according to the invention, such a DVD disc is fully compatible with the existing DVD-ROM standard and can be read by any standard DVD player, including DVD-ROM players.

FIG. 6 shows a table comparing the best-case and the worst-case situations of the closing/finalizing time when using either the filling pattern strategy according to the invention or a conventional sequential filling. In the best-case situation no closing/finalizing time is required in both situation: for sequential filling the complete data area is used and no extra filling time is required for padding (that is, writing the dummy data); when using the special filling patterns according to the invention the session/disc will be closed/finalized after writing sequence g, and again no padding needs to be performed. However, in the worst-case situation a significant reduction of the time required for closing/finalizing is obtained when the method according to the invention is applied. For conventional sequential filling the closing/finalizing time equals the time required for recording a complete layer. When half of the available disc capacity is used (that is, only one layer is recorded), the other half of the disc capacity (i.e., the other layer) needs to be padded (that is, written with dummy data). Now, when using the special filling patterns according to the invention, the closing/finalizing time equals only the time required for recording the storage space for holding the predefined amount of information with dummy data. On Layer 1 an area with the size of the storage space for holding the predefined amount of information, which is significantly less than the total recording area on Layer 1, should be padded in order for the disc to be DVD-ROM compliant. For a recordable DVD disc where a single layer may hold up to 4.7 Gbyte of data, the size of the pre-defined recording area should preferably be in the range of 50 Mbyte to 500 Mbyte (that is, at least significantly less than the total amount of storage space available on a single layer).

The invention claimed is:

1. A method of recording information on a multi layer record carrier, said record carrier comprising at least two information layers for recording the information, wherein the information to be recorded is distributed over the at least two layers according to a distribution pattern such that the amount of information stored on the at least two layers differs between the layers by a predefined amount of information or less, and wherein the information is recorded in subsequent blocks, each block for holding the predefined amount of information, and wherein the distribution pattern is such that two subsequent blocks are not recorded on the same information layer.

2. Method as claimed in claim 1, wherein areas holding recorded information on the at least two layers are superjacent.

3. Method according to claim 1, wherein the predefined amount of information is significantly less than the total amount of storage space available on one of the at least two information layers.

4. Method according to claim 1, wherein the method comprises
an initialization step of setting the size of said block for holding the predefined amount of information, and
a subsequent recording step of recording information on said at least two information layers such that the information is recorded alternately on said at least two information layers, the recording step comprising the steps of recording information on a layer until the block for holding the predefined amount of information is filled, and subsequently recording information on a different layer of said at least two information layers.

5. Method according to claim 4, wherein in the initialization step a value indicative of the size of the block for holding the predefined amount of information is read from the record carrier, and wherein the size of the block for holding the predefined amount of information is set in dependence on the read value.

6. Method according to claim 5, wherein the method comprises a further step of recording a value indicative of the set size of the block for holding the predefined amount of information on the record carrier.

7. Method according to claim 4, wherein the size of the block for holding the predefined amount of information is set in dependence on the amount of information to be stored, or on the way the information to be stored is supplied to the method, or on the type of the application supplying the information.

8. A method of recording a predefined amount of information on a multi layer record carrier, said record carrier comprising at least two information layers for storing the information, wherein the method comprises
a first initialization step of setting the size of a first block for holding the predefined amount of information, and a subsequent first recording step in a first recording session for recording information on said at least two information layers such that the information is recorded alternately on said at least two information layers, the first recording step comprising the steps of recording information on a layer until the first block for holding the predefined amount of information is filled, and subsequently recording information on a different layer of said at least two information layers, and
a second initialization step of setting the size of a second block for holding the predefined amount of information, and a subsequent second recording step in a second recording session, the second recording step comprising the steps of recording information on a layer until the second block for holding the predefined amount of information is filled, and subsequently recording information on a different layer of said at least two information layers, wherein the distribution pattern is such that two subsequent blocks are not recorded on the same information layer.

9. A recording device for recording information on a multi layer record carrier, said record carrier comprising at least two information layers for recording the information, wherein the device is adapted for carrying out a method as claimed in claim 1.

10. A multi layer record carrier comprising at least two information layers for storing information, said record carrier comprising a region holding parameter values indicative of a recording process for recording information on the record carrier, characterized in that said region comprises a value indicative of the size of a block for holding a predefined amount of information, said value indicative of the size of the block for holding the predefined amount of information used in a method according to claim 5.

* * * * *